United States Patent

[11] 3,589,644

[72] Inventors Robert J. Salkeld
410½ Landfair Ave., Los Angeles, Calif. 90024;
Robert S. Skulsky, 5337 Crestwind Drive, Rolling Hills, Calif. 90274
[21] Appl. No. 511
[22] Filed Jan. 6, 1970
[45] Patented June 29, 1971
Continuation of application Ser. No. 720,991, Apr. 12, 1968.

[54] SELF-REFERENCING SYSTEM
3 Claims, 3 Drawing Figs.
[52] U.S. Cl. ............................................. 244/1 SA
[51] Int. Cl. ............................................... B64g 1/00
[50] Field of Search ...................................... 244/1 SS, 1
SA, 3.11, 3.12, 3.13, 3.14; 102/3; 49.4, 49.5

[56] References Cited
UNITED STATES PATENTS
2,944,763 7/1960 Gradgent et al. ............. 244/3.14

Primary Examiner—Milton Buchler
Assistant Examiner—Jeffrey L. Forman
Attorney—Lyon & Lyon ABSTRACT: A vehicle, either a missile traveling in a trajectory or a space vehicle traveling in orbit, separates on command into two components by deboosting one of such components. The other component continues in trajectory or in orbit without substantially any speed reduction and serves as a traveling reference point for controlling the flight of such deboosted component.

PATENTED JUN 29 1971　　　3,589,644
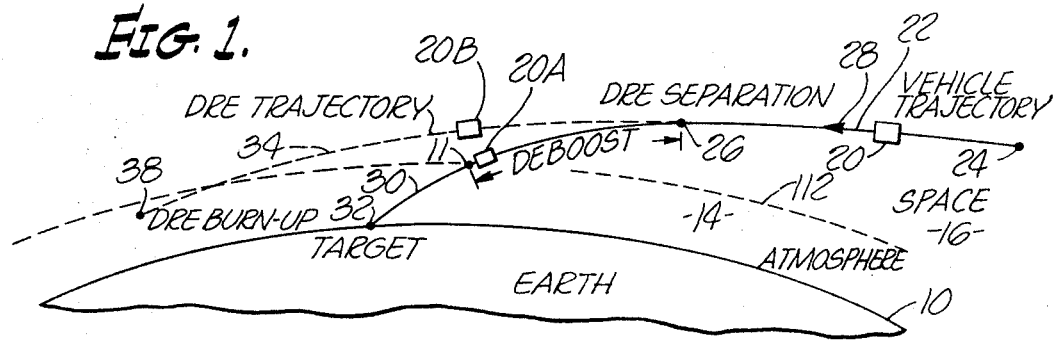
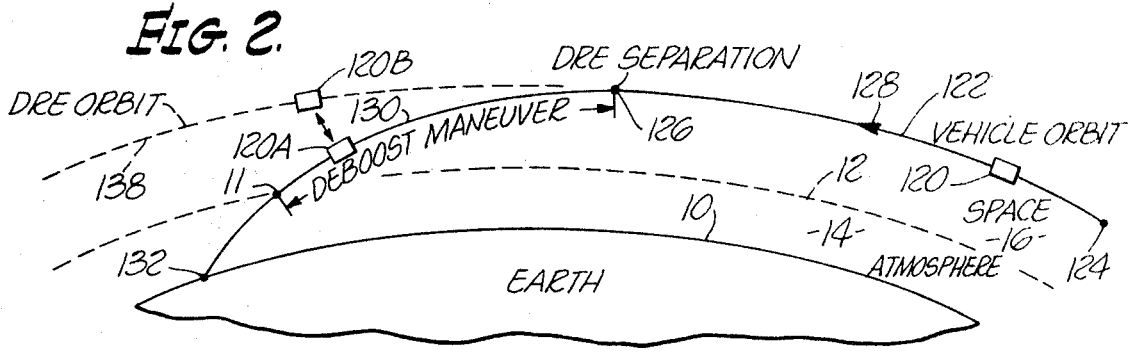
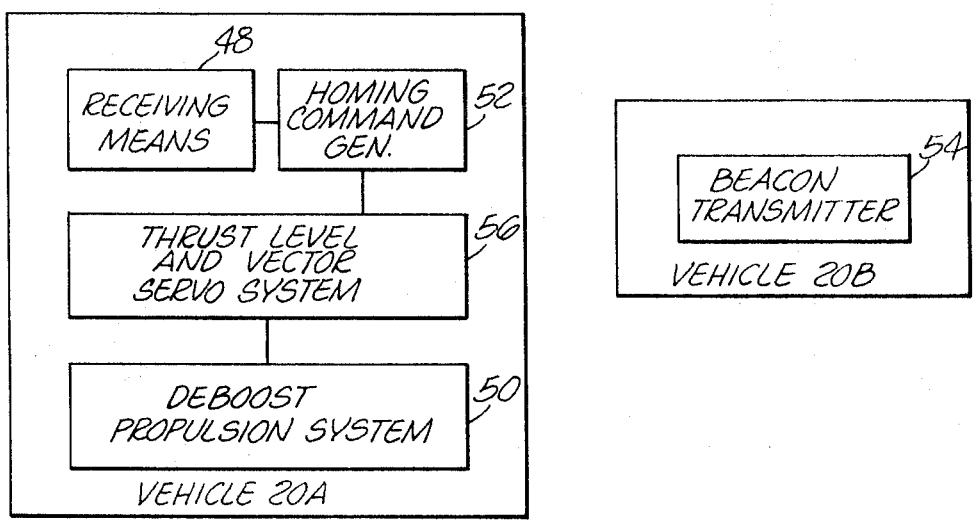
INVENTORS.
ROBERT J. SALKELD
ROBERT S. SKULSKY
BY
Lyon Lyon
ATTORNEYS

SELF-REFERENCING SYSTEM

This is a continuation of application Ser. No. 720,991 filed Apr. 12, 1968.

The present invention relates to means and techniques whereby the flight of a missile or space vehicle, either manned or unmanned, is accurately controlled.

A specific object of the present invention is to provide a system of this character in which there is a moving reference point which is uniquely related to the missile or space vehicle being controlled in the sense that such moving reference point was in fact at one time a part of the missile or space vehicle.

Another specific object of the present invention is to provide a system of this character having the capability for performing deboost or deorbit maneuvers nonimpulsively using either multiple propulsive vectors interspaced in time or continuous low-thrust propulsion whereby thrust vector programming and control may be attained without use of fixed references such as the horizon, stars or an inertial platform.

Another specific object of the present invention is to provide a system of this character which has the capability of accurately directing a missile or space vehicle to a target area.

Another specific object of the present invention is to provide a system of this character which is particularly useful in controlling the flight of vehicles reentering the earth's atmosphere at shallow angles either from ballistic trajectories or from orbit.

The present invention has particular usefulness in those instances where it is desired to have a ballistic missile reenter at a shallow angle for purposes of reducing warhead lofting altitude and thereby hiding it as much as possible from acquisition radars enhancing its ability to penetrate defenses. In these cases involving reentering at shallow angles geometric considerations impose high degree of sensitivity of impact or landing location to variations in flight path angle such that small errors in flight path angle produce large degradations in accuracy.

The present invention uses new means and techniques involving a self-referencing system which obviates problems heretofore encountered in an attempt to provide a high-accuracy shallow angle reentering system.

The features of the present invention which are believed to be novel are set forth with particularity in the appended claims.

This invention itself, both as to its organization and manner of operation, together with further objects and advantages thereof, may be best understood by reference to the following description taken in connection with the accompanying drawings in which:

FIG. 1 illustrates a system embodying features of the present invention involving the use of a vehicle moving in a trajectory.

FIG. 2 illustrates a system embodying features of the present invention involving the use of an orbital vehicle.

FIG. 3 illustrates more details of the system illustrated in FIG. 1.

Referring to FIG. 1 a portion of the earth's surface is illustrated by the curved line 10 above which a curved line 12 appears for purpose of illustrating a line of demarcation between, on the one hand, the earth's atmosphere 14 and on the other hand, space 16 beyond the earth's atmosphere.

A vehicle 20 travels in a trajectory 22, a portion of which is indicated between points 24 and 26 and in the direction indicated by the arrow 28. At point 26 the vehicle 20 separates into two components 20A and 20B with component 20A being deboosted, i.e. its velocity is decreased at point 26, such that it now no longer follows the original trajectory 22 but is directed into a new trajectory 30 which, as illustrated, extends from point 26 to a point 32 on the earth's surface 10. The other vehicle component 20B undergoes substantially no velocity change at point 26 and thus continues along a trajectory 34 which is higher than trajectory 30, the trajectory 34 being illustrated as beginning at point 26 and continuing to point 38 where it is assumed that the vehicle component 20B due to its speed burns up in the earth's atmosphere.

The travel of vehicle 20A is controlled in direction and speed as described in more detail below such that the end of its trajectory terminates at the target point 32.

FIG. 2 illustrates a like system wherein instead of the vehicle 20, as in FIG. 1, being in a trajectory the vehicle 120 is initially in an orbital path 122 extending from point 124 to point 126 and travels in the direction indicated by arrow 128 to point 126 where the vehicle separates into two components 120A and 120B.

The component 120B continues in an orbital path a portion of which extends between points 126 and 138 whereas the other vehicle component 120A is deboosted, i.e. its speed is reduced at point 126 and it thus changes its direction so as to proceed downwardly at the beginning of the path 130 which is illustrated as terminating at point 132. The travel of vehicle 120A, like the travel of vehicle 20A in FIG. 1 is controlled in direction and speed, as described in more detail below.

In operation of either system shown in FIGS. 1 and 2 a reference is used to establish the orientation of the initial thrust vector at point 26 or 126 where the vehicle 20 or 120 is transformed into two vehicles. This initial reference may be obtained adequately using conventional means such as, for example, horizon sensors, in conjunction with ion sensors. After the initial deboost, i.e. initial thrust vector the vehicle 20A or 120A begins its flight along path 30 or 130 and corrections are applied so as to orient the thrust vector using a different reference in accordance with important features of the present invention. This last-mentioned reference involves the position of the other vehicle component 20B or 120B which may be termed a deboost reference element (DRE) which is ejected from the vehicle at initiation of the maneuver and which continues along a substantially unaltered trajectory and serves as a pointing target for the deboosting vehicle when and as it changes its flight path until the maneuver is terminated as, for example, when atmospheric reentry forces become considerably dominant in affecting the flight path.

Using the above references both initial and subsequent vehicle orientation may be controlled either automatically or manually.

The vehicle 20A carries conventional equipment involving receiving means 48, a homing command generator 52, a thrust level and vector servosystem 56 and a deboost propulsion system 50. The receiving means receives signals from the beacon transmitter 54 and such signals after detection are applied to the generator 52 which is essentially a computer having its output applied to the servosystem 56, such system 56 comprising generally a one or more servosystems having as their function the control of valves in the deboost propulsion system 50 and orientation of thrust direction.

The present invention is of particular importance with respect to its capability of controlling the attitude and position of a reentry vehicle (20A or 120A) such that the same is assured of having acquired desired values at the point of reentry 11 which is defined herein as being a point along the line 12 previously defined as a line of demarcation between atmosphere 14 and space 16. This is of importance since then the flight path of the reentry vehicle (either of the ballistic or lifting type) through the atmosphere is strongly dependent on these values acquired at reentry.

Preferably the DRE unit is obscured from countermeasures such as, for example, by including it in a decoy cloud which is deployed in the trajectory with such a decoy cloud surrounding both the warhead and the DRE unit.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

We claim:

1. In a system of the character described wherein it is desired to accurately direct an object to a precise distant target, the steps comprising forming such object as a part of a two-component vehicle, causing said two-component vehicle to travel such that its trajectory parameters in relation to said target may be established, changing the relative speed of said components so as to separate the two components such that one of said components continues to travel with generally the same trajectory parameters and the other component of which said object is a part is directed generally in the direction of said target, and thereafter using characteristic features of trajectory parameters of said one component as a control reference in controlling the flight of said object to said target, said two-component vehicle being a space vehicle traveling in orbit, said other component having its speed changed such that it deorbits.

2. In a system of the character described for accurately directing an object to a precise distant target, a two-component vehicle comprising a first vehicle and a second vehicle, means for causing said two-component vehicle to travel through space such that its trajectory parameters with respect to said target may be established, means for changing the relative speed of said first and second vehicles such that the vehicles travel apart with said first vehicle continuing to travel with generally the same trajectory parameters as established by said two-component vehicle and with said second vehicle of which said object is a part being directed generally to said target, beacon transmission means on said first vehicle for transmitting information to said second vehicle as to characteristic features of said trajectory parameters of said first vehicle, and receiving means on said second vehicle and responsive to said information for controlling the flight of said object to said target, said two-component vehicle being a ballistic missile.

3. In a system of the character described for accurately directing an object to a precise distant target, a two-component vehicle comprising a first vehicle and a second vehicle, means for causing said two-component vehicle to travel through space such that its trajectory parameters with respect to said target may be established, means for changing the relative speed of said first and second vehicles such that the vehicles travel apart with said first vehicle continuing to travel with generally the same trajectory parameters as established by said two-component vehicle and with said second vehicle of which said object is a part being directed generally to said target, beacon transmission means on said first vehicle for transmitting information to said second vehicle as to characteristic features of said trajectory parameters of said first vehicle, and receiving means on said second vehicle and responsive to said information for controlling the flight of said object to said target, said two-component vehicle being a space vehicle for traveling in orbit.